United States Patent [19]
Weder

[11] 3,811,573
[45] May 21, 1974

[54] DIALYSIS APPARATUS

[76] Inventor: Hans Georg Weder, Maurstrasse 42, 8117 Fallanden, Zurich, Switzerland

[22] Filed: Dec. 13, 1972

[21] Appl. No.: 314,502

[30] Foreign Application Priority Data
Jan. 10, 1972 Switzerland.......................... 341/72

[52] U.S. Cl. .............................................. 210/321
[51] Int. Cl............................................ B01d 31/00
[58] Field of Search............................. 210/22, 321

[56] References Cited
UNITED STATES PATENTS

| | | | |
|---|---|---|---|
| 3,028,965 | 4/1962 | Isreeh | 210/321 X |
| 3,341,022 | 9/1967 | Isreeh | 210/321 X |
| 3,211,645 | 10/1965 | Ferrari | 210/321 X |
| 3,631,986 | 1/1972 | Sausse | 210/321 |

Primary Examiner—Frank A. Spear, Jr.
Attorney, Agent, or Firm—Burns, Doane, Swecker & Mathis

[57] ABSTRACT

A dialysis apparatus is disclosed having a plurality of dialysis cells. The apparatus comprises guide rods, end plates held on the guide rods, a plurality of individually spring-loaded pressure members and dialysis cells clamped between the end plates, these press members and dialysis cells being arranged in alternating sequence. Two cell halves of each dialysis cell have annular surfaces facing each other. The press members clamp, in a pressed state, by means of these annular surfaces a membrane between the two cell halves whereby two dialysis spaces are sealed in the two cell halves. The two cell halves also have cylindrical peripheral surfaces facing each other by means of which the cell halves are centered in respect of one another.

6 Claims, 7 Drawing Figures

VII-VII

DIALYSIS APPARATUS

BACKGROUND OF THE INVENTION

Dialysis devices are known. These are useful for the purpose of separating molecular dispersions of materials of colloidal nature, particularly where colloidal dispersions of particles which generally have a molecular weight greater than 15,000 are to be freed from substances, the molecular weight of which is below 10,000. The separation is attained with semipermeable membranes, the pores of which are so fine that they hold back the colloidal macromolecular particles and allow the low molecular weight substance to pass through the membrane.

An important application of dialysis is equilibrium dialysis which has been found to furnish the most accurate data regarding the of low molecular weight substances and ions (e.g., medicines, biological substrates, metal ions etc) to polymers (e.g., proteins, enzymes or nucleic acids).

Generally, a dialysis device has a membrane which is permeable to low molecular weight substances (ligand), i.e. those having molecular weights under 10,000, which divides a dialysis cell into two halves. Contained in one of these cell halves is the biopolymer which, because of a sufficiently high molecular weight (greater than 15,000) cannot pass the membrane. If a ligand-biopolymer - reaction system is created, for example, by filling one cell half with the ligand solution and the other cell half with the biopolymer solution, and subjected to equilibrium dialysis, after a time an equilibrium state appears whereby the concentrations of the free (not bound to the polymer) ligand are equal in both cell halves. Solvent composition (for example, hydrous buffers), pH value, and ionic strength must be equal in both cell halves. The free ligand concentration $c_L(f)$ remaining in the cell half without the biopolymer can be determined by means of any suitable analytical technique (e.g., spectrophotometry, liquid scintillation count of radioactive-tagged ligands, and the like). From the known starting concentration $c_L(o)$ of the ligand, the portion $c_L(b)$ bound to the biopolymers can be easily calculated.

The speed at which the equilibrium is attained depends mainly on the degree of mixing within the dialysis cells, preliminary treatment and thickness of the membrane, the dialyzing volumes in both cell halves, the biopolymer concentration, temperature, and type of the electrolytes employed. Generally volumes as small as possible and a separating face as large as possible should be used. The cell halves should be stirred or rolled around in any suitable manner so that the ligand layer forming on the membrane surface is continually renewed. The coefficient of diffusion of a ligand is very much dependent upon temperature: for relatively low molecular weight ligands the speed of diffusion increases by about 2 percent per degree Celsius.

In the known dialysis apparatus the dialysis cells are sealed by O-rings. This has the serious disadvantage that the material of the sealing ring contaminates material being dialyzed. Dialysis cells with O-ring seals because of the large and variable dead volumes, also interferes with dialysis of with the small quantities and therefore, give no reproducible results. Furthermore the dialysis membrane with the O-ring seal is only poorly clamped.

The object of the invention is to provide a dialysis apparatus in which the above described drawbacks can be obviated and by means of which, equilibrium dialysis of hitherto unattained accuracies in determining bonding data can be attained.

SUMMARY OF THE INVENTION

The dialysis apparatus according to the present invention is characterised in that the dialysis membrane and the cells are arranged in alternating sequence. Each cell is composed of two cell halves; the two cell halves of each dialysis cell having annular faces directed towards one another. In the pressed state, a membrane is clamped by means of these annular faces and dialysis chambers in the two cell halves are sealed. The two cell halves have cylindrical peripheral faces directed towards one another by means of which the cell halves are centered with respect to one another.

DETAILED DESCRIPTION

In order that the invention may be better understood, reference is made to the following description of a preferred embodiment of the dialysis apparatus according to the invention, and to the drawings in which:

FIG. 1, is a side elevation of a cell block with five dialysis cells.

FIG. 2, plan view of the same cell block.

Figure 5:
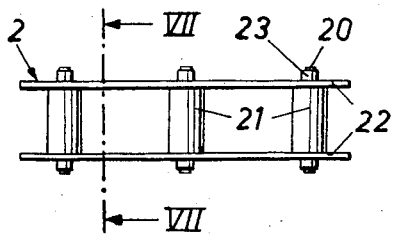
FIG. 5, is a side view of a pressure member in the closed position
Figure 6:
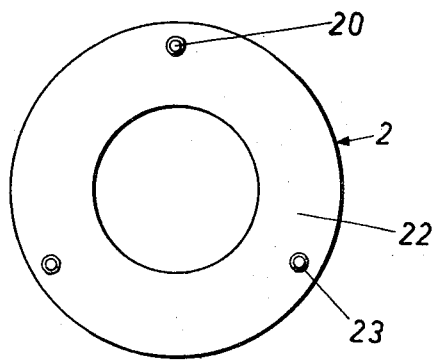
FIG. 6, is a view from above of the pressure member of FIG. 5.
Figure 7:
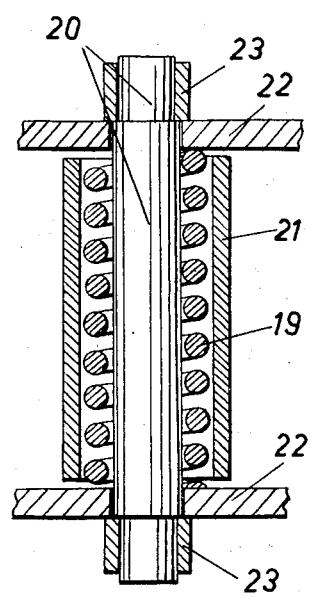

FIG. 7, on a substantially larger scale, is a section through a part of the pressure member shown in FIG. 5 in the open position.

Figure 1:
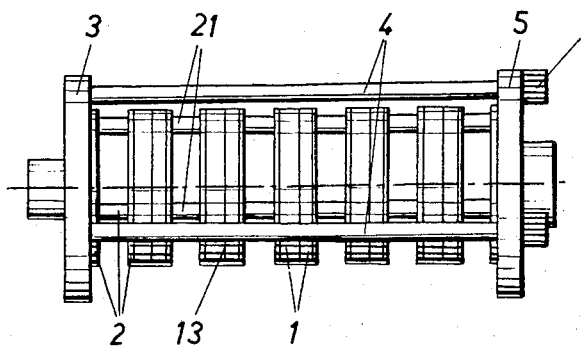
Figure 2:
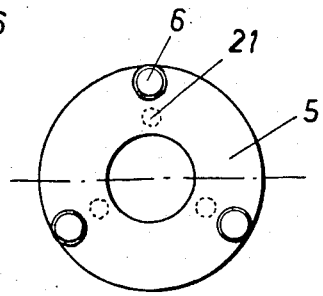

In the cell block shown in FIG. 1, five dialysis cells 1 of pressed Teflon are clamped between two pressure members 2 of stainless steel. The pressure members and the dialysis cells are threaded between three guide rods 4 of stainless steel firmly connected to an end plate 3 made of "Delrin" (polymethylene oxide). A second end plate 5 of "Delrin" which can be tightened by means of three knurled nuts 6 until the sheet metal rings 22 of the press members have a minimum spacing from the distance sleeves 21 (see FIG. 7,) to hold the whole cell pile together.

Figure 3:
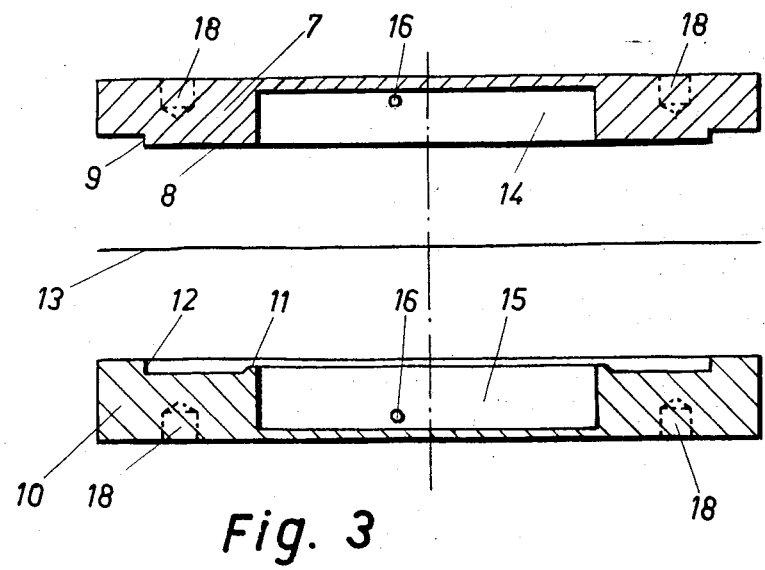
FIG. 3, is to a larger scale, an exploded section through a dialysis cell wherein the upper cell half, the membrane and the lower cell half are illustrated drawn apart from one another.
Figure 4:
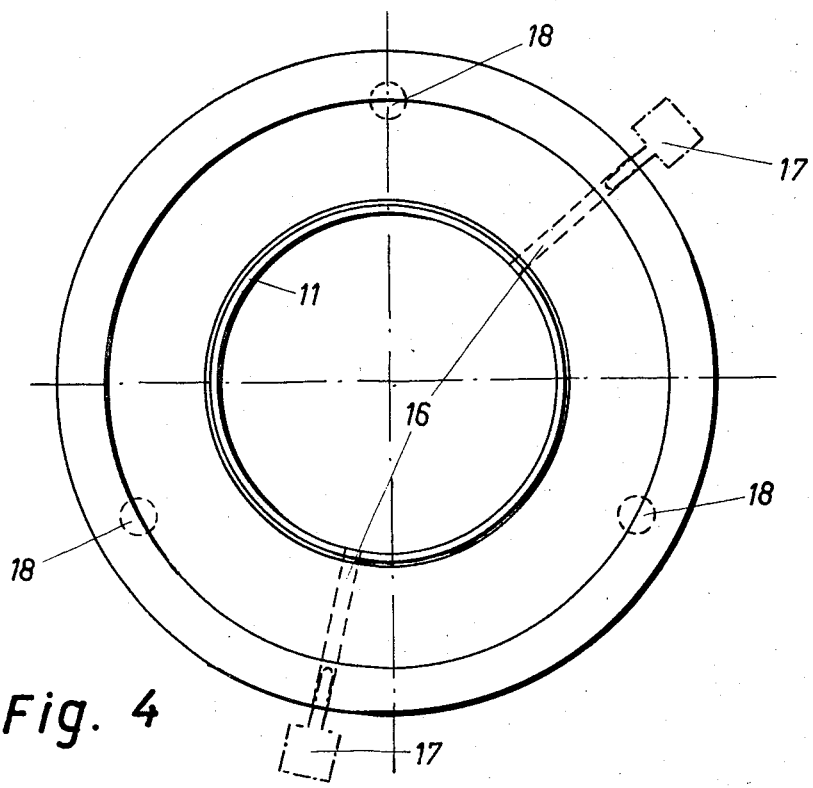
FIG. 4, is an inside view of the lower cell half of FIG. 3.

Referring to FIG. 3, a dialysis cell 1 in dismembered state is illustrated. A cell half 7 has a flat face 8 and on the edge of same a cylindrical peripheral face 9. The other cell half 10 has an annular face 11 and a cylindrical face 12. When the two cell halves 7 and 10 are pressed together, by means of the pressure members 2, as occurs in the assembled cell pile, and a membrane 13 is clamped between faces 8 and 11, these faces seal absolutely tightly the resulting two dialysis chambers 14 and 15 which are of equal size. By means of the two cylindrical faces 9 and 12 the two cell halves 7 and 10 are centered with respect of one another. Each cell half is provided with a core 16 which serves for the filling and removal of the dialysis liquid. During operation the bores are closed with stoppers 17 (FIG. 4). Each cell half is also provided with three holes 18 which serve for receiving retaining sleeves 23 for the purpose of guiding the pressure members 2.

FIG. 7, shows in section a part of the pressure member of FIG. 5 in the unclamped position. A coiled spring 19 which is disposed between a guide stub shaft or pin 20 and a spacing sleeve 21 presses two sheet metal rings 22 against two retaining sleeves 23 which are disposed on the reduced diameter ends of the rivet bolts 20.

In the compressed state the two sheet metal rings 22 of each pressure member approach the three spacing sleeves 21 up to a minimum distance of at least 0,10 mm, while the three retaining sleeves 23 engage holes 18 of a cell half of two contacting dialysis cells. The springs 19 press on the sheet metal rings 22 which in their turn act on the cell halves, press them together and thus to seal the dialysis spaces.

A dialysis apparatus comprises, for example, four of the cell blocks shown in FIG. 1, which are clamped in a housing frame (not shown) and are set in rotation by means of an electric motor (also not shown). Work can be done therefore simultaneously with twenty cells. A gentle rotation (10 to 20 turns per minute) prevents the denaturing of the biological molecules and contributes to the rapid achieving of the state of equilibrium.

The thin Teflon walls of the cell halves render possible a satisfactory exchange of heat between a thermostat bath in which the cell blocks are immersed in the housing frame and the cell content so that the diffusion rate is increased. The filling and emptying of the cells is effected in a simple manner by means of injection through the bores 16. The cells are made of Teflon because this material will not absorb any of the substances being dialyzed. The dimensions of the cells are such that the membrane forms a larger separating face for relatively small dialysis chambers.

I claim:

1. A dialysis apparatus comprising:
   a. a plurality of elongated guide rods;
   b. end plates secured to the ends of said guide rods; and
   c. a plurality of pressure members and dialysis cells clamped between said end plates in a stack having an axis, said pressure members and dialysis cells being arranged in alternating sequence, each pressure member comprising:
      i. two pressure rings and
      ii. a plurality of resilient compression means arranged between said pressure rings for resiliently urging them apart in the direction of said axis, whereby pressure is applied in opposite directions to each of said dialysis cells in the stack, each of said dialysis cells comprising two opposed cell havles, each of said cell halves having opposed annular surfaces facing each other, complementary cylindrical peripheral surfaces facing each other for centering the cell halves with respect to each other, and a dialysis membrane clamped between said opposed annular surfaces by pressure applied by the aforementioned pressure members, thereby to divide said cell into two noncommunicating chambers.

2. Apparatus in accordance with claim 1 wherein the pressure member comprises:
   a. a pair of substantially parallel pressure plates;
   b. cylindrical spacing means between said parallel pressure plates;
   c. guide means extending through said cylindrical spacing means having ends slidably protruding through both pressure plates;
   d. retaining means secured to each protruding end; and
   e. resilient pressure means within said spacing means urging the pressure plates against said retaining means.

3. Apparatus in accordance with claim 2 wherein the guide means comprises a stub shaft or pin and the resilient pressure means comprises a coiled compression spring surrounding said stub shaft or pin.

4. Apparatus in accordance with claim 2 wherein the pressure members and the dialysis cell halves are fixedly oriented with respect to one another by means of recesses in the outer surface of the cell halves exactly matching the retaining means secured to the protruding guide means of the pressure member.

5. Apparatus in accordance with claim 1 wherein inlet means are provided in each cell half for introducing a substance to be dialyzed.

6. Apparatus in accordance with claim 1 wherein the cell halves are composed of polytetrafluoroethylene.

* * * * *